US010202923B2

(12) United States Patent
Kim et al.

(10) Patent No.: US 10,202,923 B2
(45) Date of Patent: Feb. 12, 2019

(54) METHOD FOR ESTIMATING INTAKE AIR HUMIDITY

(75) Inventors: Yong-Wha Kim, Ann Arbor, MI (US);
In Kwang Yoo, Ann Arbor, MI (US);
Michiel J. Van Nieuwstadt, Ann Arbor, MI (US); Brien Lloyd Fulton, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1155 days.

(21) Appl. No.: 13/448,036

(22) Filed: Apr. 16, 2012

(65) Prior Publication Data
US 2013/0275030 A1   Oct. 17, 2013

(51) Int. Cl.
| F02D 21/08 | (2006.01) |
| F02D 41/14 | (2006.01) |
| F02D 41/00 | (2006.01) |
| F02D 41/04 | (2006.01) |

(52) U.S. Cl.
CPC ..... F02D 41/1461 (2013.01); F02D 41/0052 (2013.01); F02D 41/1466 (2013.01); F02D 41/04 (2013.01); F02D 2041/1472 (2013.01); Y02T 10/47 (2013.01)

(58) Field of Classification Search
CPC .. F02D 41/005; F02D 41/0052; F02D 41/146; F02D 41/1461; F02D 41/1462; F02D 41/1466; F02D 41/1467; F02D 41/1472; F02D 2041/1437; F02D 2041/1472; F02D 2200/0418; F01N 2560/02; F01N 2560/026; F01N 2560/028; F01N 2560/05; F01N 2560/20; F02M 35/10393

USPC ....... 701/102, 103, 108; 123/568.11, 568.21, 123/568.22, 568.31, 676, 677, 679, 688, 123/690, 691, 703; 73/29.01, 31, 69, 71, 73/74; 60/276

See application file for complete search history.

(56) References Cited

U.S. PATENT DOCUMENTS

| 4,993,386 A * | 2/1991 | Ozasa et al. ................. 123/25 J |
| 5,116,579 A * | 5/1992 | Kobayashi et al. .......... 422/111 |
| 5,672,811 A * | 9/1997 | Kato et al. .................... 73/31.05 |
| 5,866,799 A * | 2/1999 | Kato et al. .................... 73/31.05 |
| 5,939,615 A * | 8/1999 | Kato et al. .................... 73/31.05 |
| 5,997,707 A * | 12/1999 | Kato et al. .................... 204/425 |
| 6,062,204 A * | 5/2000 | Cullen ..................... 123/568.22 |
| 6,375,828 B2 * | 4/2002 | Ando et al. .................. 205/781 |
| 6,725,848 B2 | 4/2004 | Ramamurthy et al. |

(Continued)

FOREIGN PATENT DOCUMENTS

| GB | 2381872 A | * | 5/2003 |
| WO | WO 2011138387 A1 | * | 11/2011 |

OTHER PUBLICATIONS

Anonymous, "An ELCM EVAP Monitor Compensation Method for Canister Loading State," IPCOM No. IPCOM000237181D, Published Jun. 6, 2014, 2 pages.

*Primary Examiner* — John Zaleskas
(74) *Attorney, Agent, or Firm* — Julia Voutyras; McCoy Russell LLP

(57) ABSTRACT

Embodiments for estimating intake air humidity in an engine are provided. In one example, an engine method comprises adjusting an engine parameter in response to intake air humidity estimated based on a concentration of one or more engine-out emissions. In this way, one or more exhaust emission sensors may be used to estimate intake air humidity.

4 Claims, 4 Drawing Sheets

(56) References Cited

U.S. PATENT DOCUMENTS

| | | | |
|---|---|---|---|
| 6,843,051 B1* | 1/2005 | Surnilla et al. | 60/274 |
| 6,882,929 B2 | 4/2005 | Liang et al. | |
| 7,277,790 B1* | 10/2007 | Green et al. | 701/105 |
| 7,383,118 B2* | 6/2008 | Imai et al. | 701/104 |
| 7,418,957 B2 | 9/2008 | Abe | |
| 8,296,042 B2* | 10/2012 | Xiao et al. | 701/112 |
| 2002/0185107 A1* | 12/2002 | Kubesh et al. | 123/406.44 |
| 2009/0277259 A1* | 11/2009 | Sasaki et al. | 73/114.71 |
| 2010/0101213 A1* | 4/2010 | Tuomivaara et al. | 60/276 |
| 2010/0139246 A1 | 6/2010 | Andersson et al. | |
| 2010/0139250 A1* | 6/2010 | Andersson et al. | 60/285 |
| 2010/0145628 A1* | 6/2010 | Ramamurthy et al. | 702/23 |
| 2010/0218487 A1* | 9/2010 | Wang et al. | 60/287 |
| 2010/0236532 A1* | 9/2010 | Xiao et al. | 123/677 |
| 2011/0047978 A1* | 3/2011 | Zawacki et al. | 60/277 |
| 2011/0047985 A1* | 3/2011 | Zawacki et al. | 60/286 |
| 2011/0048106 A1* | 3/2011 | Zawacki et al. | 73/28.01 |
| 2011/0113767 A1 | 5/2011 | Richter | |
| 2011/0132340 A1* | 6/2011 | Soltis | 123/703 |
| 2011/0132342 A1* | 6/2011 | Soltis | F02D 41/0025 123/703 |
| 2011/0265551 A1* | 11/2011 | Hopka et al. | 73/23.31 |
| 2012/0102924 A1* | 5/2012 | Ante et al. | 60/274 |
| 2012/0227377 A1* | 9/2012 | Hopka et al. | 60/274 |
| 2013/0118232 A1* | 5/2013 | Auckenthaler et al. | 73/29.02 |

* cited by examiner

METHOD FOR ESTIMATING INTAKE AIR HUMIDITY

FIELD

The present disclosure relates to internal combustion engines.

BACKGROUND AND SUMMARY

Engine operating parameters such as air-fuel ratio, spark timing, and exhaust gas recirculation (EGR) may be adjusted to increase engine efficiency and fuel economy and decrease emissions including nitrogen oxides ($NO_x$). One factor which may affect the adjustment of such operating parameters is intake air humidity. A high concentration of water in the intake air may affect combustion temperatures, dilution, etc. Therefore, control of operating parameters including air-fuel ratio, spark timing, EGR, and the like based on humidity can be used to improve engine performance.

U.S. Pat. No. 6,725,848 describes a method for determining intake air humidity using a humidity sensor located in the intake manifold or charge air cooler. However, humidity sensors may be inaccurate under certain conditions and/or prone to degradation when exposed to high engine operating temperatures.

The inventors have recognized the issues with the above approach and provide a method to at least partly address them. In one embodiment, an engine method comprises adjusting an engine parameter in response to intake air humidity estimated based on a concentration of one or more engine-out emissions.

For example, exhaust NOx and/or particulate measurements may be compared with expected NOx and/or particulate levels, respectively, for a given humidity level in order to determine current humidity conditions. In this manner, the effect of intake air humidity on various operating parameters may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
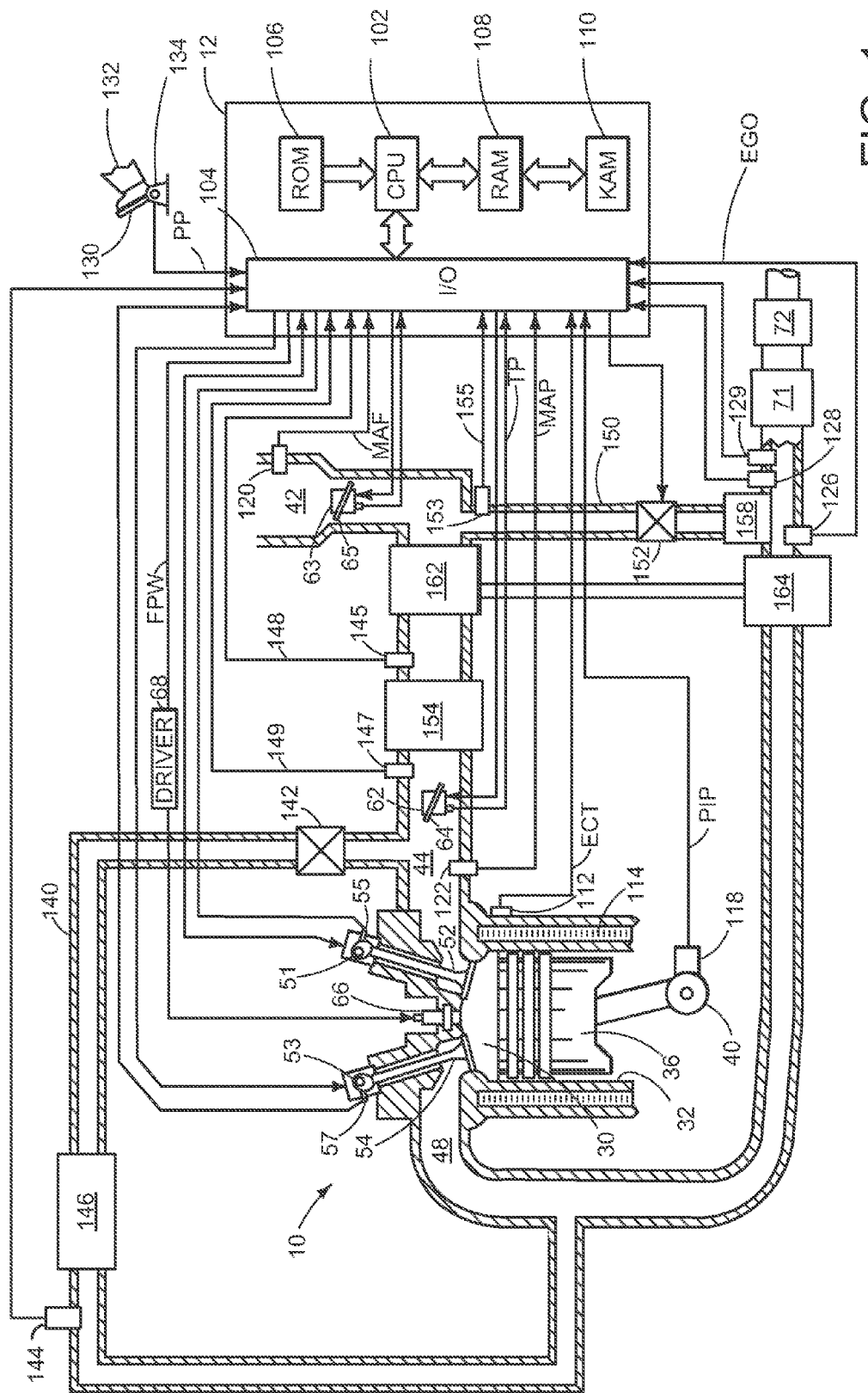
FIG. 1 shows a schematic diagram of an engine.

The concentration of various exhaust emissions, such as particulate matter (PM) and NOx, may vary based on combustion conditions. For example, NOx concentration may increase as combustion temperatures increase. To monitor engine-out emissions, vehicles may include NOx, PM, and other emission sensors. These sensors may also be used to monitor change in combustion conditions, and correlate such changes to intake air humidity changes. Humidity in the intake air may affect charge temperature, dilution, etc., and thus various engine operating parameters may be adjusted based on intake air humidity to maintain combustion stability. During select conditions, NOx and PM sensor output may be monitored to estimate intake air humidity. For example, NOx concentration in the exhaust may be inversely correlated with intake humidity, and PM concentration in the exhaust may be positively correlated with intake humidity. Further, in some embodiments, estimated NOx and PM may be compared to the NOx and PM sensor output, and the estimated humidity adjusted based on differences between each of the estimated and measured NOx and PM. FIG. 1 shows an engine including a NOx sensor, PM sensor, and a controller, which is configured to carry out the methods illustrated in FIGS. 2-5.

Referring now to FIG. 1, it shows a schematic diagram of one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Combustion in engine 10 can be of various types, depending on operating conditions. While FIG. 1 depicts a compression ignition engine, it will be appreciated that the embodiments described herein may be used in any suitable engine, including but not limited to, diesel and gasoline compression ignition engines, spark ignition engines, direct or port injection engines, etc. Further, various fuels and/or fuel mixtures such as diesel, bio-diesel, etc, may be used.

Intake passage 42 may include throttles 62 and 63 having throttle plates 64 and 65, respectively. In this particular example, the positions of throttle plates 64 and 65 may be varied by controller 12 via signals provided to an electric motor or actuator included with throttles 62 and 63, a configuration that is commonly referred to as electronic throttle control (ETC). In this manner, throttles 62 and 63 may be operated to vary the intake air provided to combustion chamber 30 among other engine cylinders. The positions of throttle plates 64 and 65 may be provided to controller 12 by throttle position signals TP. Pressure, temperature, and mass air flow may be measured at various points along intake passage 42 and intake manifold 44. For example, intake passage 42 may include a mass air flow sensor 120 for measuring clean air mass flow entering through throttle 63. The clean air mass flow may be communicated to controller 12 via the MAF signal.

Engine 10 may further include a compression device such as a turbocharger or supercharger including at least a compressor 162 arranged upstream of intake manifold 44. For a turbocharger, compressor 162 may be at least partially driven by a turbine 164 (e.g., via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12. Various turbocharger arrangements may be used. For example, a variable nozzle turbocharger (VNT) may be used when a variable area nozzle is placed upstream and/or downstream of the turbine in the exhaust line for varying the effective expansion of gasses through the turbine. Still other approaches may be used for varying expansion in the exhaust, such as a waste gate valve.

A charge air cooler 154 may be included downstream from compressor 162 and upstream of intake valve 52. Charge air cooler 154 may be configured to cool gases that have been heated by compression via compressor 162, for example. In one embodiment, charge air cooler 154 may be upstream of throttle 62. Pressure, temperature, and mass air flow may be measured downstream of compressor 162, such as with sensor 145 or 147. The measured results may be communicated to controller 12 from sensors 145 and 147 via signals 148 and 149, respectively. Pressure and temperature may be measured upstream of compressor 162, such as with sensor 153, and communicated to controller 12 via signal 155.

Further, in the disclosed embodiments, an EGR system may route a desired portion of exhaust gas from exhaust passage 48 to intake manifold 44. FIG. 1 shows an HP-EGR system and an LP-EGR system, but an alternative embodiment may include only an LP-EGR system. The HP-EGR is routed through HP-EGR passage 140 from upstream of turbine 164 to downstream of compressor 162. The amount of HP-EGR provided to intake manifold 44 may be varied by controller 12 via HP-EGR valve 142. The LP-EGR is routed through LP-EGR passage 150 from downstream of turbine 164 to upstream of compressor 162. The amount of LP-EGR provided to intake manifold 44 may be varied by controller 12 via LP-EGR valve 152. The HP-EGR system may include HP-EGR cooler 146 and the LP-EGR system may include LP-EGR cooler 158 to reject heat from the EGR gases to engine coolant, for example.

Under some conditions, the EGR system may be used to regulate the temperature of the air and fuel mixture within combustion chamber 30. Thus, it may be desirable to measure or estimate the EGR mass flow. EGR sensors may be arranged within EGR passages and may provide an indication of one or more of mass flow, pressure, temperature, concentration of $O_2$, and concentration of the exhaust gas. For example, an HP-EGR sensor 144 may be arranged within HP-EGR passage 140.

In some embodiments, one or more sensors may be positioned within LP-EGR passage 150 to provide an indication of one or more of a pressure, temperature, and air-fuel ratio of exhaust gas recirculated through the LP-EGR passage. Exhaust gas diverted through LP-EGR passage 150 may be diluted with fresh intake air at a mixing point located at the junction of LP-EGR passage 150 and intake passage 42. Specifically, by adjusting LP-EGR valve 152 in coordination with first air intake throttle 63 (positioned in the air intake passage of the engine intake, upstream of the compressor), a dilution of the EGR flow may be adjusted.

A percent dilution of the LP-EGR flow may be inferred from the output of a sensor 145 in the engine intake gas stream. Specifically, sensor 145 may be positioned downstream of first intake throttle 63, downstream of LP-EGR valve 152, and upstream of second main intake throttle 62, such that the LP-EGR dilution at or close to the main intake throttle may be accurately determined. Sensor 145 may be, for example, an oxygen sensor such as a UEGO sensor.

Exhaust gas sensor 126 is shown coupled to exhaust passage 48 downstream of turbine 164. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), HC, or CO sensor. Further, exhaust passage 48 may include additional sensors, including a NOx sensor 128 and a particulate matter (PM) sensor 129, which indicates PM mass and/or concentration in the exhaust gas. In one example, the PM sensor may operate by accumulating soot particles over time and providing an indication of the degree of accumulation as a measure of exhaust soot levels.

Emission control devices 71 and 72 are shown arranged along exhaust passage 48 downstream of exhaust gas sensor 126. Devices 71 and 72 may be a selective catalytic reduction (SCR) system, three way catalyst (TWC), $NO_X$ trap, various other emission control devices, or combinations thereof. For example, device 71 may be a TWC and device 72 may be a particulate filter (PF). In some embodiments, PF 72 may be located downstream of TWC 71 (as shown in FIG. 1), while in other embodiments, PF 72 may be positioned upstream of TWC 72 (not shown in FIG. 1).

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 102 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, etc.

Figure 2:
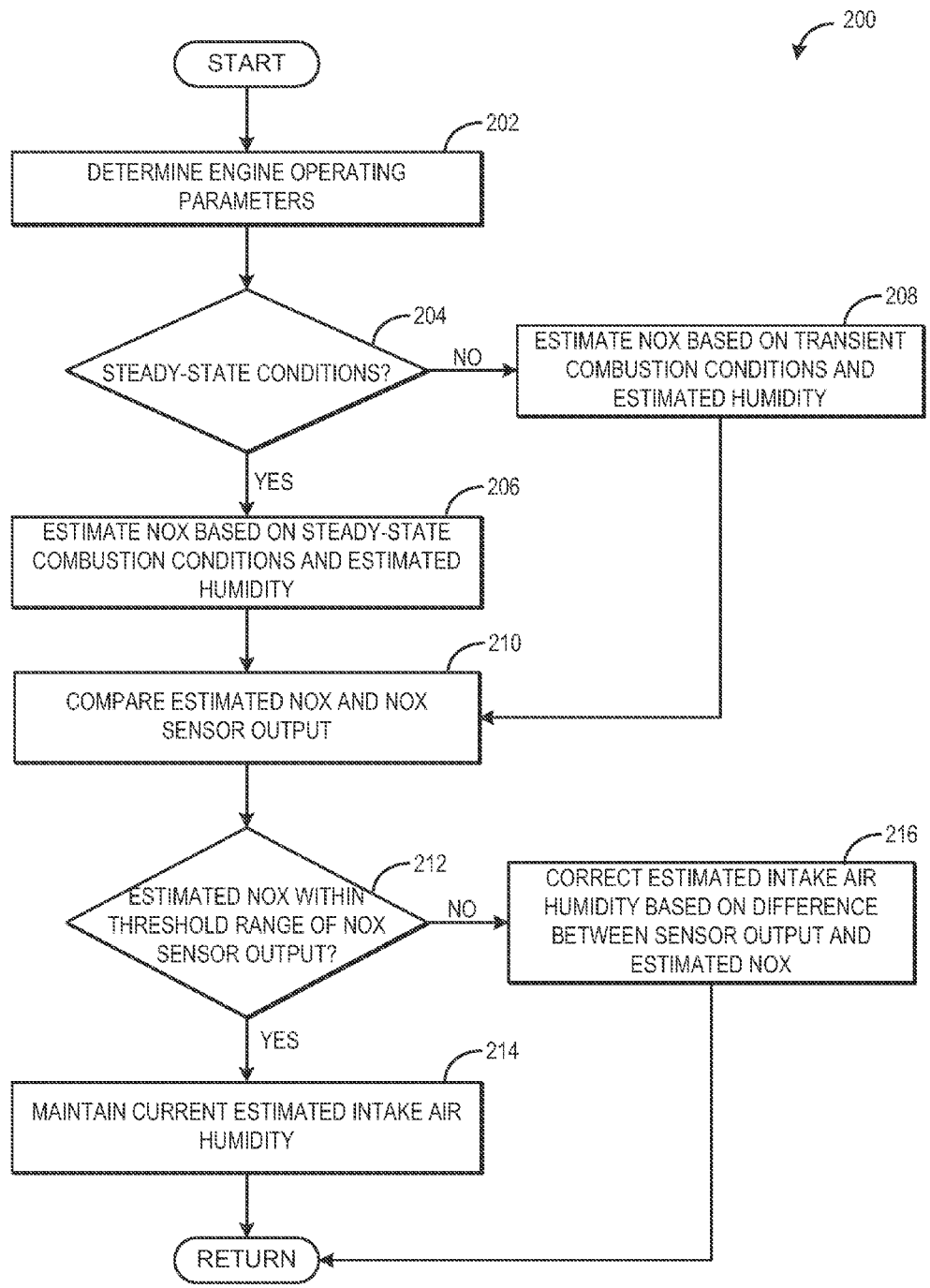
FIG. 2 shows a flow diagram illustrating a method for estimating intake air humidity based on sensor output according to an embodiment of the present disclosure.

FIG. 2 is a flow chart illustrating a method 200 for estimating intake air humidity based on NOx sensor output. Method 200 may be carried out by a controller, such as controller 12 of FIG. 1, according to instructions stored therein. Method 200 utilizes an initial estimated intake humidity, along with additional operating parameters, to calculate an estimated exhaust NOx concentration. The estimated NOx is then compared to the NOx concentration as measured by the NOx sensor, and the initial estimated intake humidity may be adjusted based on the difference between the estimated and measured NOx in order to determine a current estimated intake air humidity.

Method 200 comprises, at 202, determining engine operating parameters. The determined engine operating parameters include engine speed, engine load, ECT, MAP, MAF, VGT or waste gate position, camshaft timing, fuel injection amount and timing, etc. The determined engine operating parameters may include an initial estimated intake air humidity. Intake air humidity may include the level of humidity of the air in the intake manifold and/or the level of humidity of the charge air in the combustion cylinders prior to combustion. The initial estimated intake air humidity may include a previously estimated intake air humidity. In another embodiment, the initial estimated intake air humidity may include humidity estimated based on operating conditions, such as engine temperature, mass air flow, manifold pressure, etc. Further, in some embodiments, the initial estimated intake air humidity may be a preset value, such as an average ambient humidity based on, for example, geography, time of year, etc.

At 204, it is determined if the engine is operating in steady-state conditions. Steady-state conditions may be determined by comparing some or the entire determined engine operating parameters to previously determined engine operating parameters. For example, engine speed and load may be collected for a given duration, such as one second, five seconds, ten seconds, etc., and if speed and load have not changed by a threshold amount, such as 10%, steady-state conditions may be indicated.

If steady-state conditions are indicated, method 200 proceeds to 206 to estimate exhaust NOx concentration based on steady-state combustion conditions and estimated humidity. If steady-state conditions are not indicated, method 200 proceeds to 208 to estimate exhaust NOx concentration based on transient conditions and estimated humidity. Estimating NOx during steady-state conditions and estimating NOx during transient conditions both utilize particular engine operating parameters during transient conditions, such as injection timing and engine temperature, to predict engine-out NOx levels during the transient. Further, the predicted NOx from both conditions may be used in conjunction with NOx measured by the sensor to adjust the initial estimated intake air humidity (explained in more detail below). However, the two conditions differ in introduced error, frequency of occurrence, and other parameters, and thus may result in different relative contributions of humidity to the predicted NOx levels.

Referring first to NOx estimation during steady-state conditions at 206, NOx may be estimated based on current engine parameters including injection timing, fuel injection amount, air-fuel ratio, engine load, engine temperature, and the humidity estimated at 202. However, steady-state conditions may result in steady-state error, wherein the input to the system (e.g., commanded air-fuel ratio) does not match the actual output (e.g., air-fuel ratio as measured by an exhaust gas sensor). This may result in, for example, a smaller relative contribution of the change in humidity to the resultant change in NOx levels. To overcome this, NOx may be estimated multiple times over a given duration, for example once every 100 ms for five seconds, and the predicted NOx concentrations averaged. Alternatively or additionally, steady-state error caused by certain engine operating parameters may overshadow the effect of humidity on the estimated NOx, and as such estimating NOx during steady-state conditions may include removing certain operating parameters from the NOx estimation, such as commanded air-fuel ratio.

Referring now to NOx estimation during transient conditions at 208, similar to estimating NOx during steady-state conditions, NOx may be estimated during transient conditions, such as a tip-in event, based on engine operating parameters collected during the transient operation. These operating parameters include injection timing, fuel injection amount, air-fuel ratio, engine load, engine temperature, etc., and the humidity estimated at 202. In some embodiments, NOx may be predicted for a plurality of transient conditions, and the predicted NOx levels averaged. Alternatively or additionally, certain operating parameters may be removed from the NOx calculation, such as LP-EGR amount. As some operating parameters (such as LP-EGR) experience a delay in responding to a transient condition, these parameters may not be used in the transient NOx prediction, or they may be adjusted/weighted differently than during steady-state conditions. Further, in some embodiments, the operating parameters used to determine transient NOx levels may be the same as the operating parameters used to determine steady-state NOx levels. However, in other embodiments, the operating parameters may be different, and/or may have some overlap.

In one example, because the transient NOx estimation is less sensitive to drift and other steady state errors in the sensors and mapping data, transient NOx readings may be used to identify more accurate corrections to the estimated humidity. For example, during a tip-in, the changes in the magnitude of a NOx spike for a given set of operating conditions may correlate more accurately to humidity changes and thus provide improved humidity sensing.

Method 200 proceeds to 210 to compare estimated NOx to measured NOx after estimating NOx during steady-state or transient conditions. In some embodiments, NOx may be estimated only during steady-state conditions or only during transient conditions. In other embodiments, NOx may be estimated during both steady-state conditions and transient conditions, and the estimated humidity corrections (explained in more detail below) for each may be averaged. The estimated NOx may be compared to NOx levels measured by the NOx sensor. If the estimated NOx is estimated multiple times over a duration, it may be compared to an average measured NOx for that time duration.

At 212, it is determined if estimated NOx is within a threshold range of the measured NOx. The threshold range may a suitable range, such as within 1%, within 5%, within 10%, etc. If yes, method 200 proceeds to 214 to maintain the initial estimated intake air humidity as the current intake air humidity. As the NOx levels predicted using the initial estimated intake air humidity are approximately equal to the measured NOx levels, the current intake humidity has not changed from the initial estimate. However, if the answer at 212 is no, that is, if the estimated NOx is not within a threshold range of the measured NOx, method 200 proceeds to 216 to adjust the initial estimated humidity based on the difference between the measured NOx and the estimated NOx. In this way, the change in NOx levels from the estimated to the measured may be attributed to a change in humidity away from the initial estimated humidity. Upon determining the current intake air humidity, method 200 returns.

Figure 3:
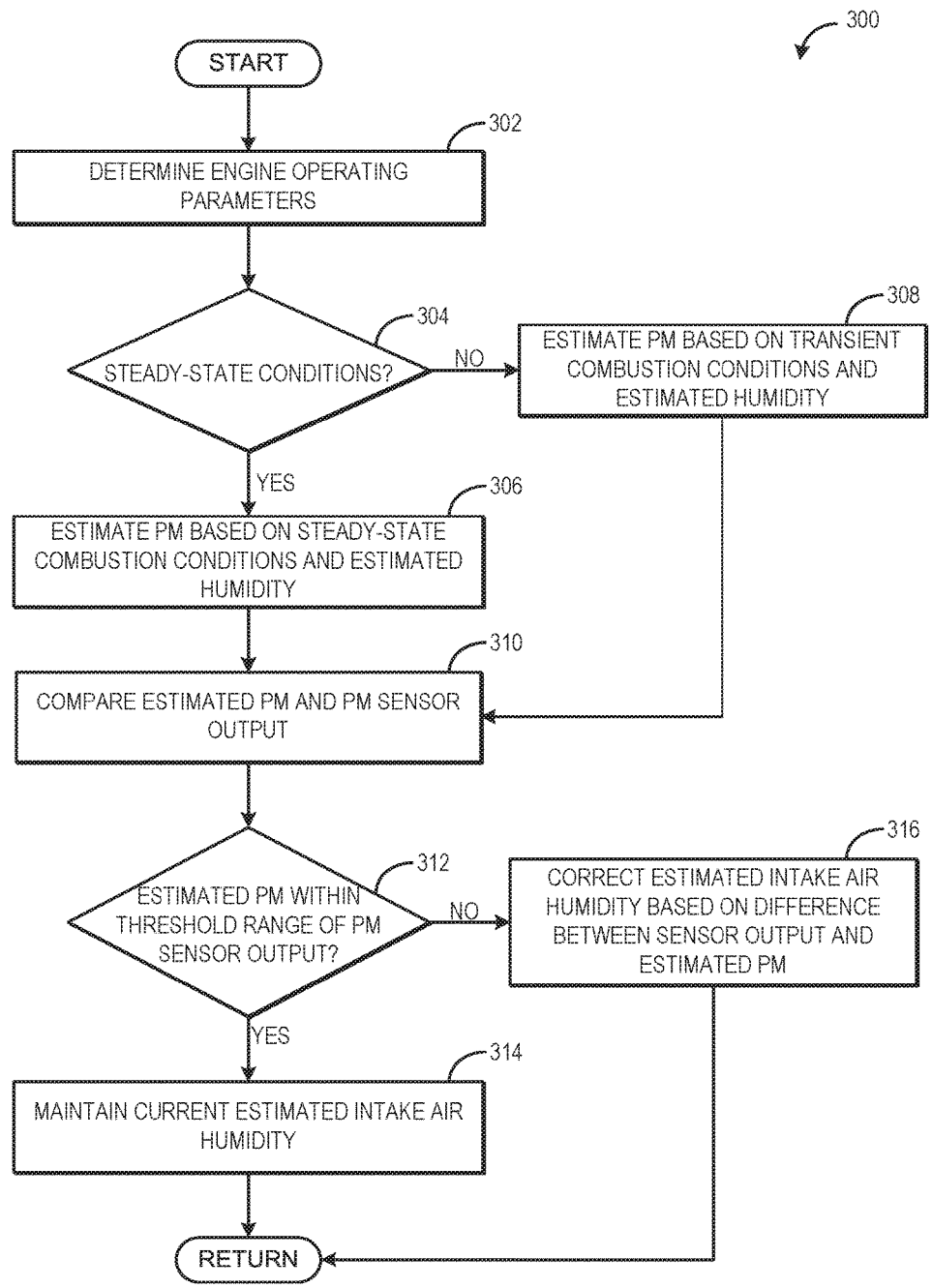
FIG. 3 shows a flow diagram illustrating a method for estimating intake air humidity based on sensor output according to an embodiment of the present disclosure.

FIG. 3 illustrates a method 300 for estimating intake air humidity based on PM sensor output. Method 300 may be carried out by a controller, such as controller 12 of FIG. 1, according to instructions stored therein. Method 300 utilizes an initial estimated intake humidity, along with additional operating parameters, to calculate an estimated exhaust PM concentration. Similar to method 200 described above with respect to FIG. 2, the estimated PM is then compared to the PM concentration as measured by the PM sensor, and the initial estimated intake humidity may be adjusted based on the difference between the estimated and measured PM in order to determine a current estimated intake air humidity. Method 300 is substantially similar to method 200; however, the operating parameters used to estimate PM may differ from the operating parameters used to estimate NOx.

Method 300 comprises, at 302, determining engine operating parameters. The determined engine operating parameters include engine speed, engine load, ECT, MAP, MAF, VGT or waste gate position, camshaft timing, fuel injection amount and timing, etc. The determined engine operating parameters may include an initial estimated intake air humidity, similar to the initial intake air humidity determined above with respect to method 200. At 304, it is determined if steady-state conditions are present. If yes, method 300 proceeds to 306 to estimate PM based on steady-state combustion conditions and estimated humidity. Calculating an estimated PM concentration during steady-state may be similar to calculating an estimated NOx during steady-state. However, the operating parameters used to calculate PM may be different than those used to calculate NOx. For example, PM may be affected by changes in air-fuel ratio to a greater extent than NOx levels. Further, while intake air humidity may cause NOx levels to decrease, intake air humidity may cause PM levels to increase.

If steady-state conditions are not present, method 300 proceeds to 308 to estimate PM levels based on transient combustion conditions, similar to estimating NOx during transient conditions. However, the operating parameters used to estimate PM may be different than the parameters used to estimate NOx.

Both 306 and 308 proceed to 310 to compare estimated PM and PM sensor output. The steady-state and/or transient estimated PM concentrations may be compared to measured PM levels. At 312, it is determined if the estimated PM is within a threshold range (for example, similar to the threshold range of method 200). If yes, method 300 proceeds to 314 to maintain the initial estimated intake air humidity as the current intake air humidity. If no, method 300 proceeds to 316 to correct the initial estimated intake humidity based on the difference between the estimated PM and the measured PM in order to calculate the current intake air humidity. After determining the current intake air humidity, method 300 returns.

Figure 4:
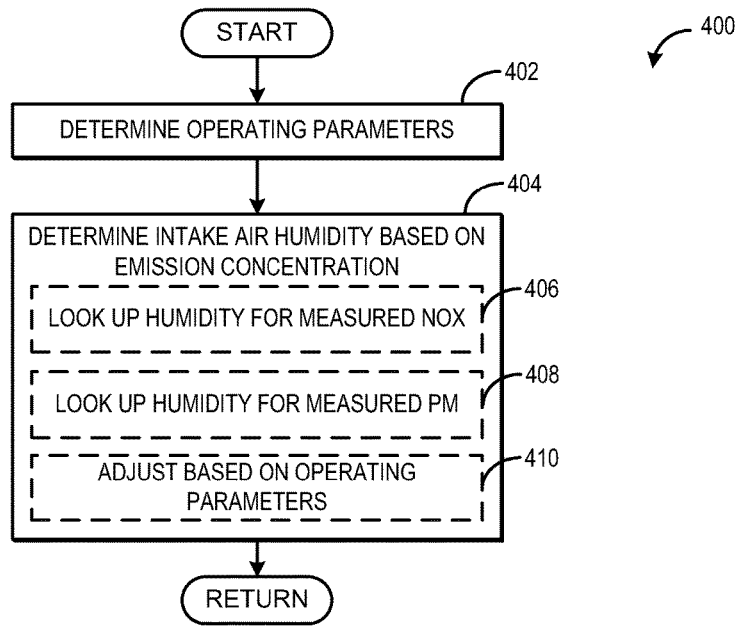
FIG. 4 shows a flow diagram illustrating a method for estimating intake air humidity based on sensor output according to an embodiment of the present disclosure.

FIG. 4 illustrates a method 400 for estimating intake air humidity based on emission sensor output according to an embodiment of the present disclosure. Method 400 may be carried out by controller 12 according to instructions stored therein. Method 400 estimates intake air humidity based on measured NOx and/or PM levels. During select operating parameters, NOx and PM levels may be directly correlated with intake air humidity. When the engine is operating under these conditions, intake air humidity may be determined by accessing a look up table stored in the memory of the controller, which maps certain engine operating parameters and correlates intake air humidity with the NOx and/or PM levels.

Method 400 includes, at 402, determining engine operating parameters. The determined engine operating parameters include engine speed, engine load, ECT, MAP, MAF, VGT or waste gate position, camshaft timing, fuel injection amount and timing, etc. If a subset or all the determined engine operating parameters are within a predetermined range (e.g., stoichiometric air-fuel ratio, low load, low speed, VGT at default position, etc.) method 400 proceeds to 404 to determine intake air humidity based on one or more engine out emission concentrations. If the operating parameters are not in a desired range, method 400 may return until a time when the operating parameters are in range. Alternatively, one or more operating parameters may be commanded to be within the range for a short time period so that humidity can be determined. For example, air-fuel ratio may be temporarily adjusted.

Determining intake air humidity may include, at 406, looking up the humidity for measured NOx levels. Alternatively or additionally, determining intake air humidity may include, at 408, looking up intake humidity for measured PM levels. In some embodiments, only NOx or PM levels may be used to estimate intake air humidity. In other embodiments, both NOx and PM levels may be used to estimate intake air humidity, for example the estimated humidities may be averaged.

At 410, the estimated humidity may be adjusted based on operating parameters. For example, if one or more engine operating parameters determined at 402 are out of the range mapped to the look-up table, a correction may be applied to adjust the estimated humidity based on the operating parameter. For example, if engine temperature is higher than the range specified for the look-up table, the estimated humidity may be adjusted, e.g., the humidity may be increased. Upon determining the estimated intake air humidity, method 400 returns.

Thus, the methods 200, 300, and 400 of FIGS. 2-4 provide for estimating intake air humidity. The methods may be executed individually or in combination, in parallel or in series. For example, both methods 200 and 300 may be performed in parallel, and the intake humidity estimated by each method averaged. Alternatively or additionally, the methods 200 and 300 may be compared to each other to ensure each model is valid and/or determine possible sensor degradation (if the models result in significantly different estimated humidities, for example). In some embodiments, method 400 may be performed instead of methods 200 and 300. As method 400 estimates intake air humidity without relying on an initial intake air humidity, method 400 may be performed initially to estimate intake air humidity. This initial estimated intake air humidity may then be used during the execution of method 200 and/or 300, for example as the initial estimated intake air humidity determined in 202 and 302. The current estimated intake air humidity, whether determined from one or more of methods 200, 300, and 400, may be used to adjust engine operating parameters to maintain desired combustion conditions and/or prevent combustion instability, as described below with respect to FIG. 5.

Figure 5:
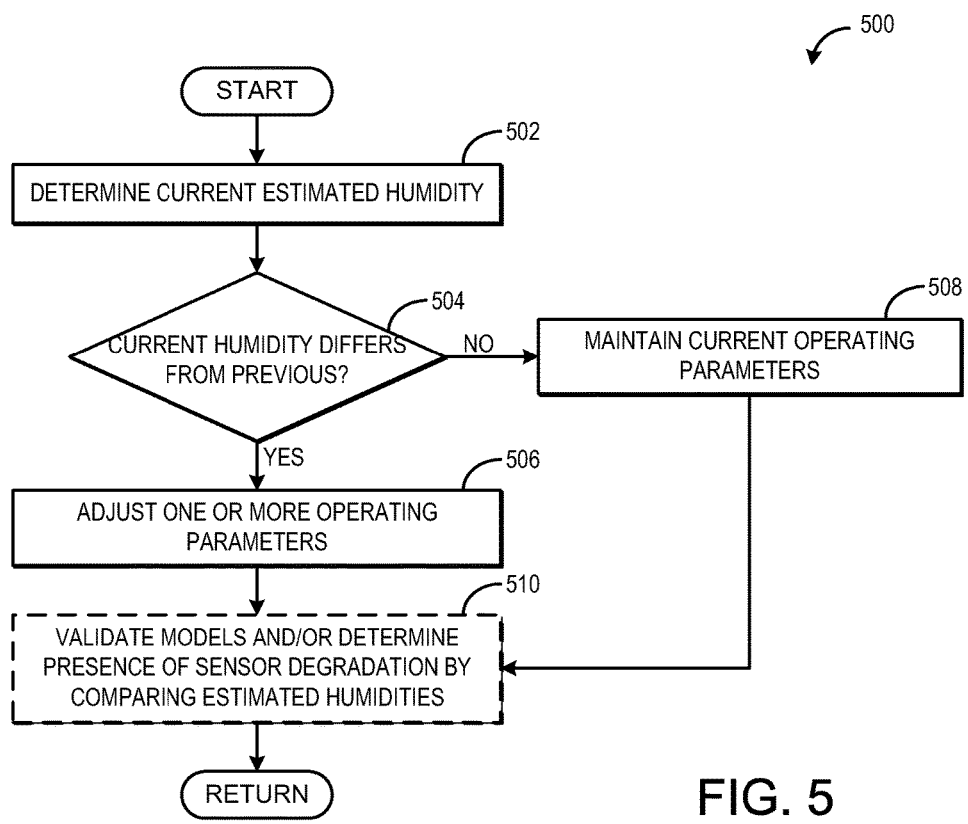
FIG. 5 shows a flow diagram illustrating a method for adjusting operating parameters based on estimated intake air humidity according to an embodiment of the present disclosure.

FIG. 5 illustrates a method 500 for adjusting operating parameters based on estimated humidity. Method 500 may be carried out by controller 12 according to instructions stored in the memory therein. Method 500 comprises, at 502, determining a current estimated intake air humidity. The current intake air humidity may be estimated according to method 200 of FIG. 2, method 300 of FIG. 3, and/or method 400 of FIG. 4. At 504, it is determined if current humidity differs from a previously estimated humidity. If the current humidity is similar to a previous humidity, for example if the humidities are substantially equal (e.g., less than 10% different), method 500 proceeds to 508 to maintain current operating parameters. If the current humidity is different from the previous humidity, that is, if humidity has increased or decreased since a previous humidity determination, the current operating parameters may not be optimized or otherwise set to provide stable combustion. As such, method 500 proceeds to 506 to adjust one or more engine operating parameters based on the current intake air humidity.

Responsive to the intake air humidity determined at 502, a plurality of operating parameters may be adjusted under selected engine combusting conditions. Such operating parameters may include an amount of EGR, spark timing, air-fuel ratio, and VCT, among others. In internal combustion engines, it is desirable to schedule engine operating parameters, such as spark timing and camshaft timing, in order to optimize engine performance. In some embodiments, only one parameter may be adjusted in response to the humidity. In other embodiments, any combination or subcombination of these operating parameters may be adjusted in response to the estimated intake air humidity.

In one example embodiment, an amount of exhaust gas recirculation (EGR) may be adjusted based on the estimated intake air humidity. For example, in one condition, the water concentration in the air surrounding the vehicle may have increased due to a weather condition such as fog; thus, a higher humidity is detected by the NOx and/or PM sensor. In response to the increased humidity measurement, the EGR flow into at least one combustion chamber may be reduced. As a result, engine efficiency may be maintained.

Responsive to a change in estimated intake air humidity, EGR flow may be increased or decreased in at least one combustion chamber. As such, the EGR flow may be increased or decreased in only one combustion chamber, in some combustion chambers, or in all combustion chambers. Furthermore, the magnitude of change of the EGR flow may be the same for all cylinders or the magnitude of change of the EGR flow may vary by cylinder based on the specific operating conditions of each cylinder.

In another embodiment that includes a spark-ignition engine, spark timing may be adjusted responsive to the estimated intake air humidity. In at least one condition, for example, spark timing may be advanced in one or more cylinders during subsequent engine fueling operation responsive to a higher humidity estimate. Spark timing may be scheduled so as to reduce knock in low humidity conditions (e.g., retarded from a peak torque timing), for example. When an increase in humidity is detected, spark timing may be advanced in order to maintain engine performance and operate closer to or at a peak torque spark timing.

Additionally, spark timing may be retarded in response to a decrease in estimated intake air humidity. For example, a decrease in estimated intake air humidity from a higher humidity may cause knock. If the decrease in humidity is detected, spark timing may be retarded and knock may be reduced. It should be noted that spark may be advanced or retarded in one or more cylinders. Further, the magnitude of change of spark timing may be the same for all cylinders or one or more cylinders may have varying magnitudes of spark advance or retard.

In a further example embodiment, variable cam timing (VCT), and thus valve timing, may be adjusted during subsequent engine fueling operation based on the estimated intake air humidity. Camshaft timing may be set for optimal fuel economy and emissions corresponding to a low ambient humidity, for example. In order to maintain optimal fuel economy and emissions and prevent engine misfire, camshaft timing may be adjusted for one or more cylinder valves in response to an increase or decrease in estimated intake air humidity. Depending on the current VCT schedule and the time of cam timing adjustment, various combinations of valves may be adjusted; for example, one or more exhaust valves, one or more intakes valves, or a combination of one more intake valves and one or more exhaust valves may be adjusted. Furthermore, VCT may be adjusted in a similar manner responsive to a decrease in estimated intake air humidity.

In still another example embodiment, exhaust gas air-fuel ratio may be adjusted responsive to the estimated intake air humidity. For example, an engine may be operating with a lean air-fuel ratio optimized for low humidity. In the event of an increase in humidity, the mixture may become diluted, resulting in engine misfire. If an increase in humidity is detected however, the AFR may be adjusted so that the engine will operate with a smaller degree of leanness, e.g., a less lean AFR than when humidity is low, but still a lean air-fuel ratio. Likewise, an AFR may be adjusted to be a larger degree of leanness, e.g., a more lean, lean air-fuel ratio in response to a decrease in estimated intake air humidity. In this way, conditions such as engine misfire due to humidity fluctuations may be reduced.

In some examples, an engine may be operating with a stoichiometric air-fuel ratio or a rich air-fuel ratio. As such, the AFR may be independent of ambient humidity and fluctuations in humidity may not result in an adjustment of AFR.

In this way, engine operating parameters may be adjusted responsive to estimated intake air humidity generated by output from a NOx and/or PM sensor coupled to an engine exhaust system. As such, intake air humidity may be estimated frequently and one or more engine operating parameters may be adjusted accordingly, resulting in an optimized overall engine performance despite fluctuations in humidity.

Method 500 includes, at 510, optionally validating the NOx and PM models, and/or determining the presence of sensor degradation by comparing humidities estimated using different methods. As explained above, multiple methods, such as the method discussed above with respect to FIGS. 2-4, may be used alone or in combination to determine intake air humidity. These methods include different models for determining intake air humidity, and utilize different inputs. In some embodiments, the estimated humidity from one model (e.g., method) may used to validate the estimations from other models. For example, the humidity estimated using engine-out NOx levels may be the primary estimation used for inferring humidity and the subsequent adjustment of operating parameters. This estimation may be compared to humidity as inferred using PM levels. If both humidities are relatively equal, the models may be considered valid. However, if a significant difference is present, one or both of the models may not be valid. If so, one or both of the NOx and PM models may be tuned to provide more accurate humidity estimation.

Further, if the NOx or PM sensor is degraded, an incorrect humidity estimation may be provided. To determine if a sensor has degraded, the estimated NOx or estimated PM concentration may be compared to the measured levels; if the measured level is significantly different (by a larger amount than can be accounted for by a change in humidity) than the estimated level, sensor degradation may be indicated.

Thus, methods 200-500 of FIGS. 2-5 provide for an engine method including adjusting an engine parameter in response to intake air humidity estimated based on a concentration of one or more engine-out emissions. The method may also include wherein the intake air humidity is estimated based on exhaust NOx concentration. Estimating intake air humidity based on exhaust NOx concentration may include estimating exhaust NOx concentration based on a plurality of combustion conditions; comparing the estimated NOx concentration to NOx sensor output; and estimating intake air humidity based on a difference between the estimated NOx and NOx sensor output. The plurality of combustion conditions may include mass air flow, an exhaust gas recirculation amount, engine speed, and engine temperature.

The method also includes wherein adjusting the engine parameter in response to the intake air humidity further comprises adjusting an exhaust gas recirculation amount, wherein the adjusting the exhaust gas recirculation amount includes in at least one condition, reducing the amount of exhaust gas recirculation in response to a higher humidity, wherein adjusting the engine parameter in response to the intake air humidity further comprises adjusting a throttle valve position, and/or wherein adjusting the engine parameter in response to the intake air humidity further comprises adjusting engine air/fuel ratio.

Another method provided by FIGS. 2-5 includes estimating intake air humidity from an output of a NOx sensor; and reducing an exhaust gas recirculation amount as intake air humidity increases. The method includes wherein the output of the NOx sensor comprises exhaust NOx concentration, and wherein as exhaust NOx concentration increases, the estimated intake air humidity decreases. The method also includes wherein estimating intake air humidity from the output of the NOx sensor further comprises estimating intake air humidity from the output of the NOx sensor and from an output of a particulate matter sensor. The method includes wherein the output of the particulate matter sensor comprises exhaust particulate matter concentration, and wherein as exhaust particulate matter increases, the estimated intake air humidity increases.

The engine system presented in FIG. 1 may be configured to include an exhaust system coupled to the engine including a NOx sensor and a particulate matter sensor; and a controller including instructions to estimate intake air humidity based on output from the NOx sensor and particulate matter sensor, and adjust an engine operating parameter based on the estimated intake air humidity. The controller also includes instructions to estimate intake air humidity based on output from the NOx sensor and particulate sensor by: estimating exhaust NOx concentration and exhaust particulate matter concentration based on a previously estimated intake air humidity and at least one or more of mass air flow, an exhaust gas recirculation amount, engine speed, and engine temperature; and adjusting the previously estimated intake air humidity based on a difference between the estimated NOx concentration and a NOx concentration output from the NOx sensor and a difference between the estimated particulate matter concentration and a particulate matter concentration output from the particulate matter sensor.

The controller may include further instructions to, if the engine is operating with a lean air-fuel ratio, adjust a degree of leanness of the air-fuel ratio based on the estimated intake air humidity. The controller may include further instructions to, if the engine is operating with a stoichiometric or rich air-fuel ratio, then maintain the air-fuel ratio at a desired air-fuel ratio regardless of the estimated intake air humidity. The controller may include instructions to adjust an EGR amount based on the estimated intake air humidity.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   reducing a first exhaust gas recirculation (EGR) amount as a first estimated intake air humidity increases, wherein the first estimated intake air humidity is estimated from a first output of a NOx sensor and a low pressure exhaust gas recirculation (LPEGR) amount;
   reducing a second EGR amount as a second estimated intake air humidity increases, wherein the second estimated intake air humidity is estimated from a second output of the NOx sensor and not using the LPEGR amount; and
   wherein the first estimated intake air humidity and the second estimated intake air humidity decrease as the NOx sensor outputs an exhaust NOx concentration that increases.

2. The engine method of claim 1, wherein the first estimated intake air humidity is estimated based on steady-state engine operating conditions, wherein the second estimated intake air humidity is estimated based on non-steady-state engine operating conditions, wherein estimating the first intake air humidity from the first output of the NOx sensor further comprises estimating intake air humidity from the first output of the NOx sensor and from a first output of a particulate matter sensor responsive to the steady-state engine operating conditions, and wherein estimating the second estimated intake air humidity from the second output of the NOx sensor further comprises estimating intake air humidity from the second output of the NOx sensor and from a second output of the particulate matter sensor responsive to the non-steady-state engine operating conditions.

3. The engine method of claim 2, wherein the first output of the particulate matter sensor comprises a first exhaust particulate matter concentration, and wherein as the first exhaust particulate matter concentration increases, the first estimated intake air humidity increases.

4. The engine method of claim 2, further comprising decreasing air-fuel ratio as humidity increases, and wherein the steady-state engine operating conditions comprise an engine speed or load not changing by more than a threshold amount during a predetermined duration.

* * * * *